US 6,734,360 B2

(12) United States Patent
Magno

(10) Patent No.: US 6,734,360 B2
(45) Date of Patent: May 11, 2004

(54) GROUND EXPANSION JOINT COUPLING

(75) Inventor: Jose Maria D. Magno, Cordova, TN (US)

(73) Assignee: Thomas & Betts International, Inc., Sparks, NV (US)

( * ) Notice: Subject to any disclaimer, the term of this patent is extended or adjusted under 35 U.S.C. 154(b) by 0 days.

(21) Appl. No.: 10/267,229

(22) Filed: Oct. 9, 2002

(65) Prior Publication Data

US 2003/0029625 A1 Feb. 13, 2003

Related U.S. Application Data

(63) Continuation of application No. 09/845,891, filed on Apr. 30, 2001.
(60) Provisional application No. 60/203,717, filed on May 12, 2000, and provisional application No. 60/268,684, filed on Feb. 14, 2001.

(51) Int. Cl.[7] .............................................. H02G 15/00
(52) U.S. Cl. ..................................................... 174/84 R
(58) Field of Search ............................ 174/84 R, 88 C, 174/21 R, 86, 845

(56) References Cited

U.S. PATENT DOCUMENTS

| 3,783,178 A | 1/1974 | Philibert et al. |
| 4,250,350 A | 2/1981 | Polimine |
| 4,403,105 A | 9/1983 | Hess et al. |
| 4,558,173 A | 12/1985 | Gajaliva et al. |
| 4,705,480 A | 11/1987 | Dumontet et al. |
| 5,466,890 A | 11/1995 | Stagnitti |
| 5,648,639 A | 7/1997 | Hand |

FOREIGN PATENT DOCUMENTS

JP          0010097          1/1978

*Primary Examiner*—Chau N. Nguyen
(74) *Attorney, Agent, or Firm*—Hoffmann & Baron, LLP

(57) ABSTRACT

The present invention provides expansion joints that allow direct attachment of conduits to the ends thereof without the need for disassembling the expansion joint. The expansion joints include a first expansion joint body which is elongate and is attachable at one end directly to an electrical conduit. The first joint body movably accommodates therein a second joint body, which is elongate and is attachable at one end to an electrical conduit. Grounding means is provided between the first and second joint bodies, which maintains ground continuity between the joint bodies upon relative movement therebetween.

13 Claims, 12 Drawing Sheets

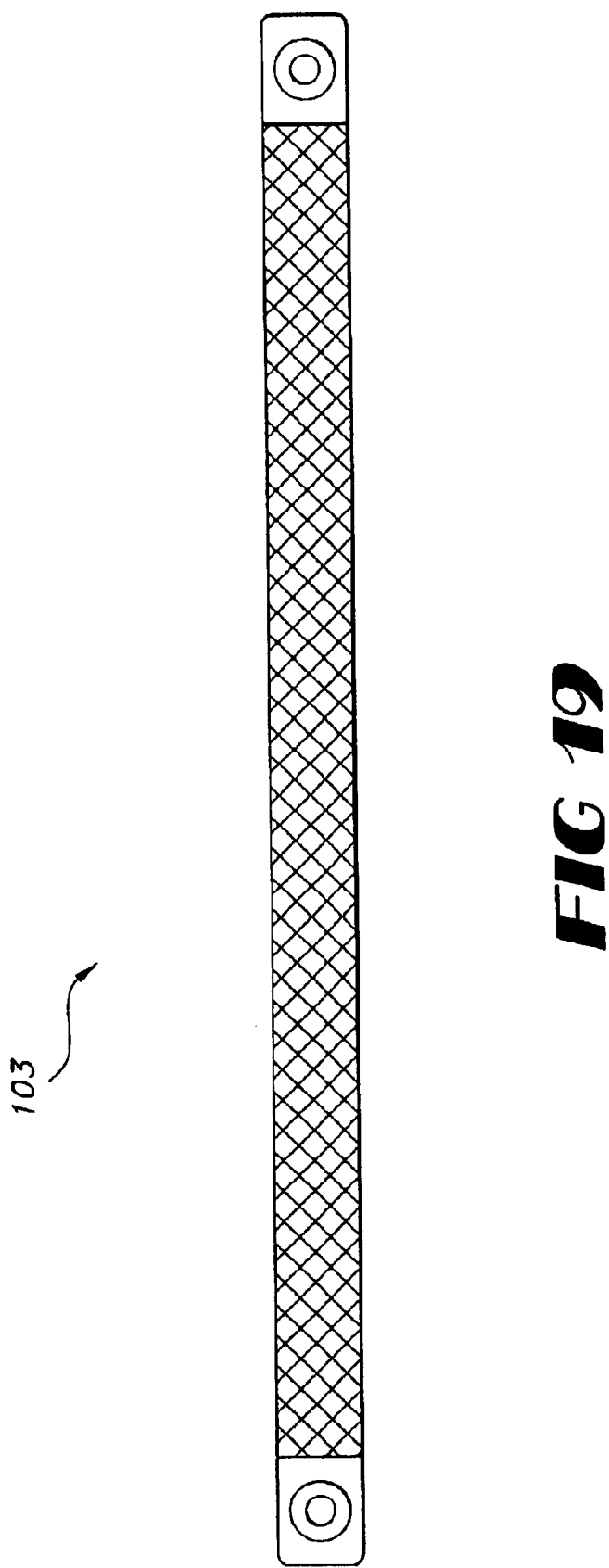

GROUND EXPANSION JOINT COUPLING

Cross Reference to Related Application

This application is a continuation of Ser. No. 09/845,891 filed Apr. 30, 2001, which claims priority to Ser. No. 60/203,717, filed on May 12, 2000 and Ser. No. 60/268,684, filed on Feb. 14, 2001.

FIELD OF THE INVENTION

The present invention relates generally to an expansion joint used to couple electrical conduits. More particularly, the present invention relates to an expansion joint coupling which is attachable to conduits without disassembly, and which maintains ground continuity thereacross upon expansion of the joint.

BACKGROUND OF THE INVENTION

Electrical conduit is typically used to support runs of electrical wiring. These conduits may be metallic, and in certain instances are required to be grounded. Conduits supporting such electrical wiring may be interconnected at electrical fitting joints. Certain of these joints provide for thermal expansion, permitting relative movement between the conduits in response to ambient temperature fluctuations. These joints must not only provide for relative movement between the conduits, but also must maintain ground continuity across the conduits during such movement.

It is well known to use expansion joints to effect connection between conduits. Certain existing expansion fittings use an external bonding jumper to provide ground continuity. This method requires additional ground clamps and straps to be installed to one end of the conduit and then connect to the other conduit end in similar manner. Installation requires disassembly of the expansion coupling, insertion of the conduit through the hub nut, screw attachment of the bushing to the conduit, insertion of sub-assembly into the body of the expansion joint and tightening of the hub nut to the required torque value. This requires more time to install (more labor hours), and requires an additional component such as external bonding jumpers to be purchased and installed.

Other expansion fittings include a ring shaped grounding element that is mounted on a screw threaded bushing formed in a movable end portion where one end of the conduit is threaded. This bushing with the ring shaped grounding element is disposed in a sliding connection with the inner cylindrical surface of the coupling body. The other conduit end is threaded into the coupling body's reducer hub end. While this expansion coupling does not require an external bonding jumper, it still requires disassembly during installation. Another disadvantage is the required extra effort to insert the screw thread bushing with the ring shaped grounding element into the inside diameter of the expansion coupling body.

Examples of expansion joints are shown in U.S. Pat. Nos.: 3,783,178; 4,250,350; 4,558,173; and 5,466,890. Each of these expansion joints requires, to some extent, disassembly of components of the expansion joint in order to attach the conduits to the joint. Even partial disassembly of the expansion joint is difficult and time consuming to perform in the field. Much of the disassembly of the expansion joint is necessitated by the fact that most of the expansion joints of the prior art require that one of the conduits be attached to the ground mechanism which maintains ground continuity between the conduit and the joint during relative movement therebetween. Thus, while one conduit may be easily fixably attached to one end of the joint, the other conduit must be attached to the ground components of the joint which are designed to be movably positioned within the joint itself.

It is desirable, therefore, to provide an expansion joint which allows a direct attachment of conduits to the ends thereof, yet maintains ground connection across the conduits during relative movement therebetween.

SUMMARY OF THE INVENTION

The present invention provides an expansion joint that allows direct attachment of conduits to the ends thereof without the need for disassembling the expansion joint. The expansion joint includes a first expansion joint body which is elongate and is attachable at one end directly to an electrical conduit. The first joint body movably accommodates therein a second joint body, which is attachable at one end to an electrical conduit. Grounding means is provided between the first and second joint bodies, which maintains ground continuity between the joint bodies upon relative movement therebetween.

The present invention further provides an electrical expansion joint for interconnecting a pair of electrical conduits comprising an elongate generally cylindrical outer body having an attachment end for attachment to one of the conduits and a reception end for receiving the other conduit. A conduit mounting member is movably supported within the outer body in ground continuity therewith. The conduit mounting member is attachable to the other conduit while the conduit mounting member is movably supported within the outer body.

In an embodiment of the present invention, there is provided an electrical expansion joint for interconnecting first and second electrical conduits including an elongate generally cylindrical outer body having an attachment end for attachment to the first electrical conduit and an opposed reception end. An elongate generally cylindrical inner body includes an attachment end for attachment to the second electrical conduit and an opposed insertion end for insertion into the reception end of the outer body for relative movement therein. A ground member is interposed between the inner and outer bodies for maintaining ground continuity therebetween throughout the relative movement.

BRIEF DESCRIPTION OF THE DRAWINGS

FIG. 19 is a plan view of the flexible braid of the expansion joint of FIG. 7.

DETAILED DESCRIPTION OF THE PREFERRED EMBODIMENT

The expansion joints of the present invention may be used with rigid metal conduit and IMC, to couple together two sections of conduit subject to longitudinal movement. The expansion joints are installed without the need for unit disassembly. The expansion joints are internally grounded and, therefore, do not require an external bonding jumper when used indoor or outdoor. The expansion joints of the present invention may be used with long conduit runs to permit linear movement caused by thermal expansion and contraction. Also, for long conduit runs the expansion joints prevent conduits from buckling and circuit failures.

The expansion joints of the present invention provide an effective grounding means (i.e., the path to ground is permanent and continuous), for the sections of the conduit. In one embodiment the internal grounding method uses an integral telescopic conduit pipe that provides the linear movement. A metallic ring ensures the entire conduit system remains a continuous electrical conductor. In another embodiment of the present invention, a metallic flexible braided cable provides that the entire conduit system remains a continuous electrical conductor.

These expansion joints are weatherproof and approved for use indoors and outdoors without an external bonding jumper. The expansion joints of the present invention meet the requirements of the National Electrical Code, providing an electrically continuous raceway with no additional bonding means required.

Figure 1:
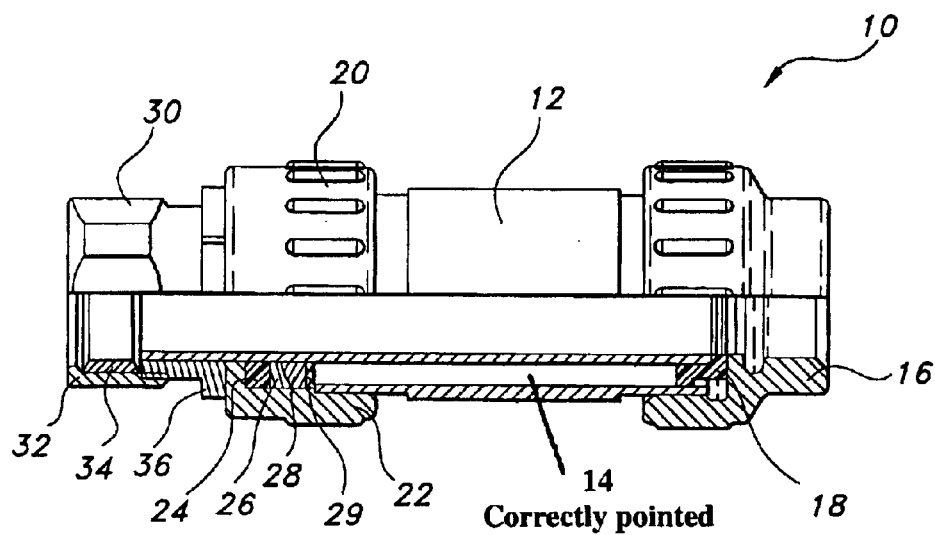
FIG. 1 is a plan view partially in section of the expansion fitting of the present invention.
Figure 2:
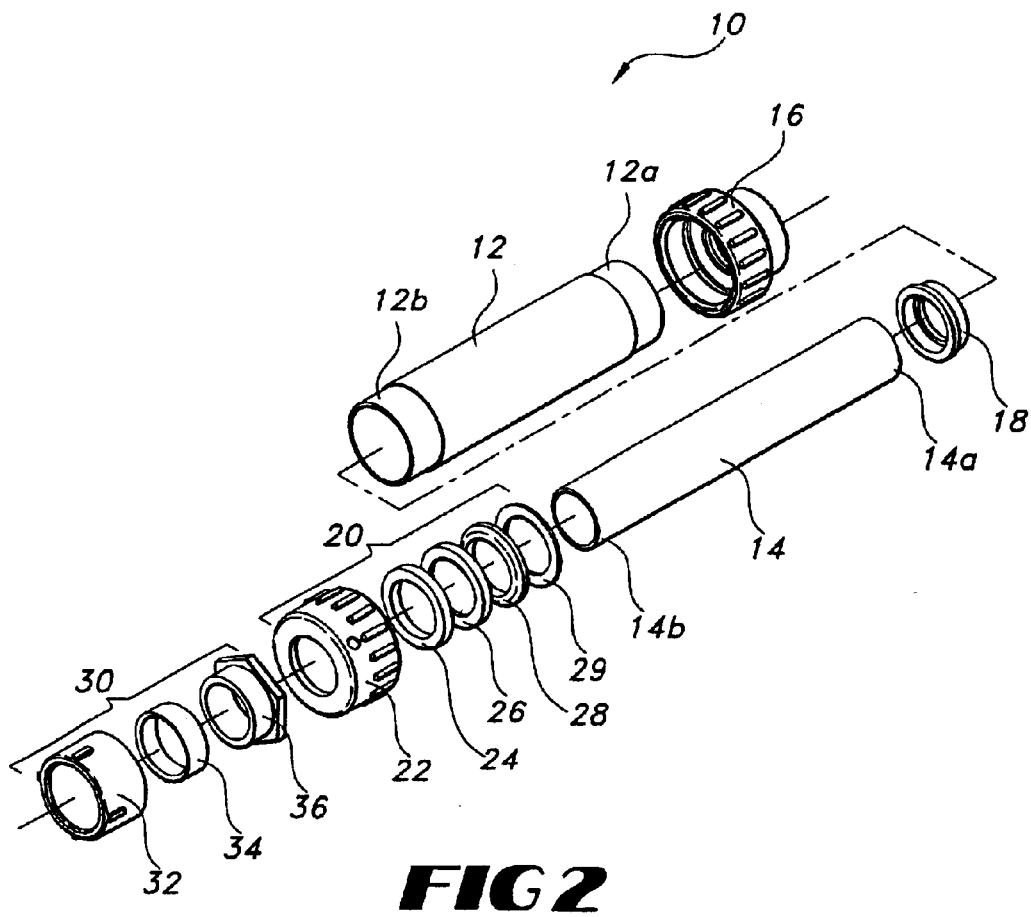
FIG. 2 is an explosive perspective showing of the expansion fitting of FIG. 1.

Expansion joint 10 of one embodiment of the present invention is shown in FIGS. 1 and 2. Expansion joint 10 is an elongate member, including an outer cylindrical pipe or body 12 and an inner cylindrical pipe or body 14. The outer cylindrical body 12 has a conduit accommodating end 12a, opposed reception end 12b for accommodating the inner cylindrical body 14 therein and a tubular body 13 therebetween. At the conduit accommodating end 12a, the outer cylindrical body 12 supports a female reducer gland nut 16 for direct screw threaded attachment of an extent of electrical conduit (not shown) thereto. A plastic bushing 18 may be interposed between the reducer gland nut 16 and the end 12a of outer body 12 to effect a seal thereat.

Reception end 12b of outer cylindrical body 12 provides for the slidable accommodation of inner cylindrical body 14 therein. Inner cylindrical body 14 includes an insertion end 14a for insertion into end 12a of outer body 12, and a conduit attachment end 14b opposed therefrom. A securement assembly 20 is attachable to end 14b of inner cylindrical body 14 so as to movably secure the inner cylindrical body within the outer cylindrical body. The securement assembly 20 provides a gland nut 22 which is attachable to the end 12b of outer cylindrical body 12 by screw fitted attachment thereto. Positioned between the gland nut 22 and the outer cylindrical body 14 and in engagement with end 12b at outer cylindrical body 12 is a packing seal ring 24, an angled spacer 26, a flexible braid ring 28 and a flat washer 29. The flexible braid ring 28 circumscribes the inner cylindrical body and is in contact therewith. While a braid ring is shown, other grounding components which make engagement between the inner body 14 and outer body 12 may also be employed. The flexible braid ring 28 maintains ground connection between the outer cylindrical body 12 and the inner cylindrical body 14 throughout slidable movement of the inner cylindrical body 14 within outer cylindrical body 12. The angled spacer 26 helps assure that the flexible braid ring maintains such grounded connection.

The securement assembly is fixably and non-movably attached to the end 12b of outer cylindrical body 12. It, however, allows the slidable movement of the inner cylindrical body 14 therewithin. The end 14b of inner cylindrical body 14 may be terminated with an Erikson® coupling assembly 30. Erikson coupling assembly 30 provides for the direct screw threaded attachment of a second electrical conduit (not shown) thereto. Erikson coupling assembly 30 includes a coupling case 32, a coupling ring 34, a coupling bushing 36. As is well known in the art, the coupling assembly 30 provides for the direct screw threaded attachment of the conduit thereto. It may also be appreciated that the inner body 14 is rotatable within the outer body 12. This allows screw attachment of long runs of conduit which cannot be rotated onto the inner and outer bodies.

Figure 3:
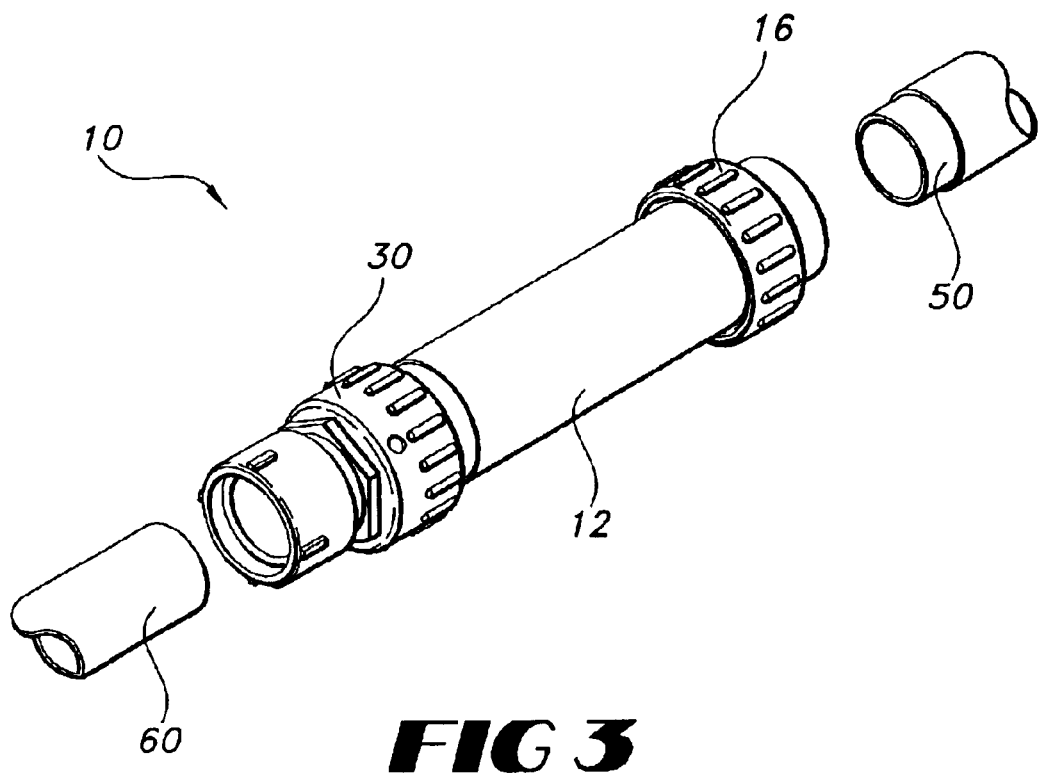
FIGS. 3–6 are perspective showings of the successive steps of assembly of conduits to the expansion fittings of FIGS. 1 and 2.
Figure 4:
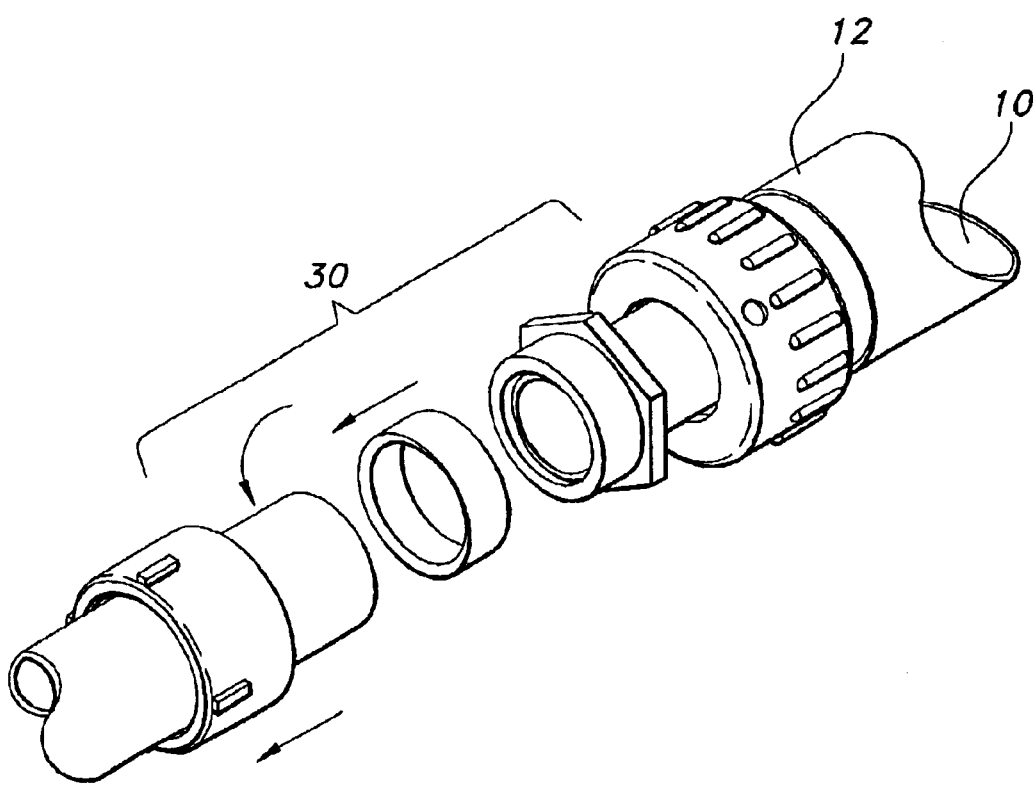
Figure 5:
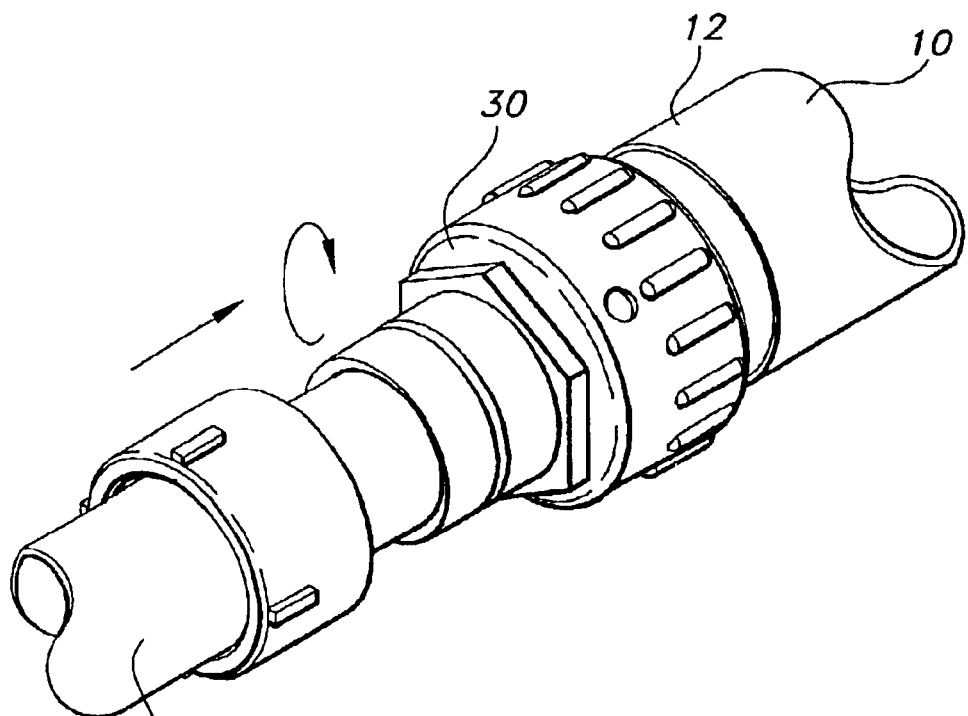

Having described the components of the expansion joint of the present invention, the assembly may be described with respect to FIGS. 3–6. The expansion fitting 10 of the present invention is provided to the end user pre-assembled as shown in FIG. 3. The installer then threads an end of one conduit 50 to reducer gland nut 16 in conventional fashion. The reducer gland nut 16 is internally threaded so as to accommodate the external threads at the end of conduit 50. Thereafter, the user can similarly thread an end of conduit 60 to the opposite end of fitting 10 by screwing attaching conduit 60 to the Erikson coupling assembly 30. In a similar fashion, the Erikson coupling assembly is internally screw threaded to accommodate the external screw threads at the end of conduit 60.

As may be appreciated, no disassembly of the fitting is required. The conduits can be threaded using appropriate torque as may be required and as is well known in the art.

Figure 6:
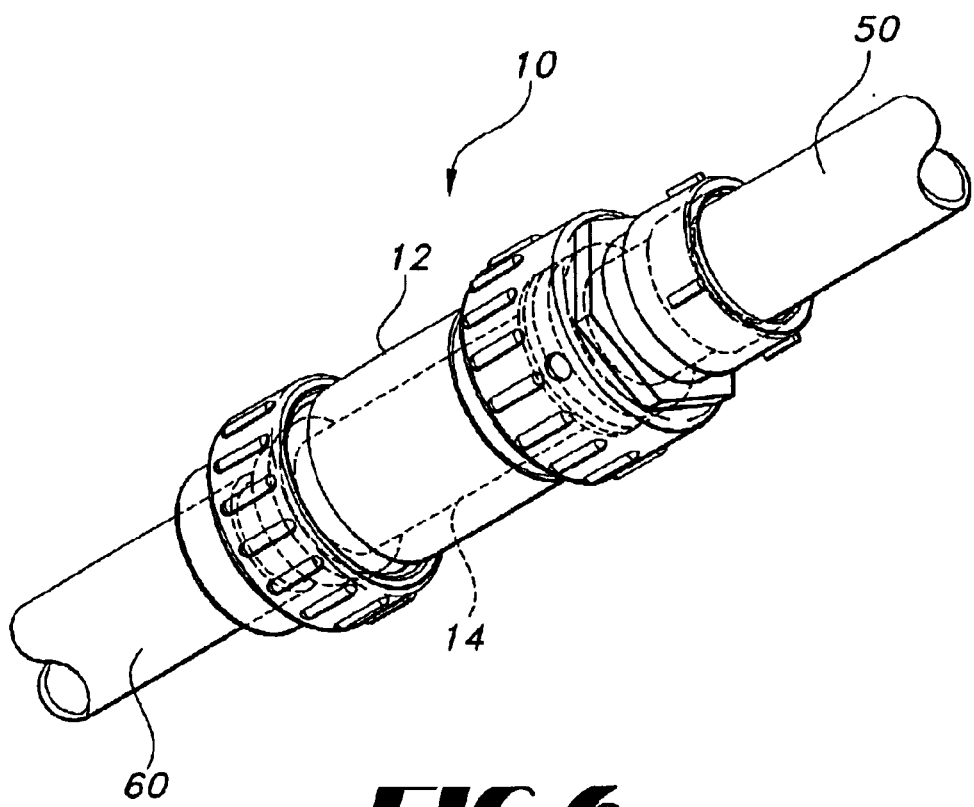
Figure 7:
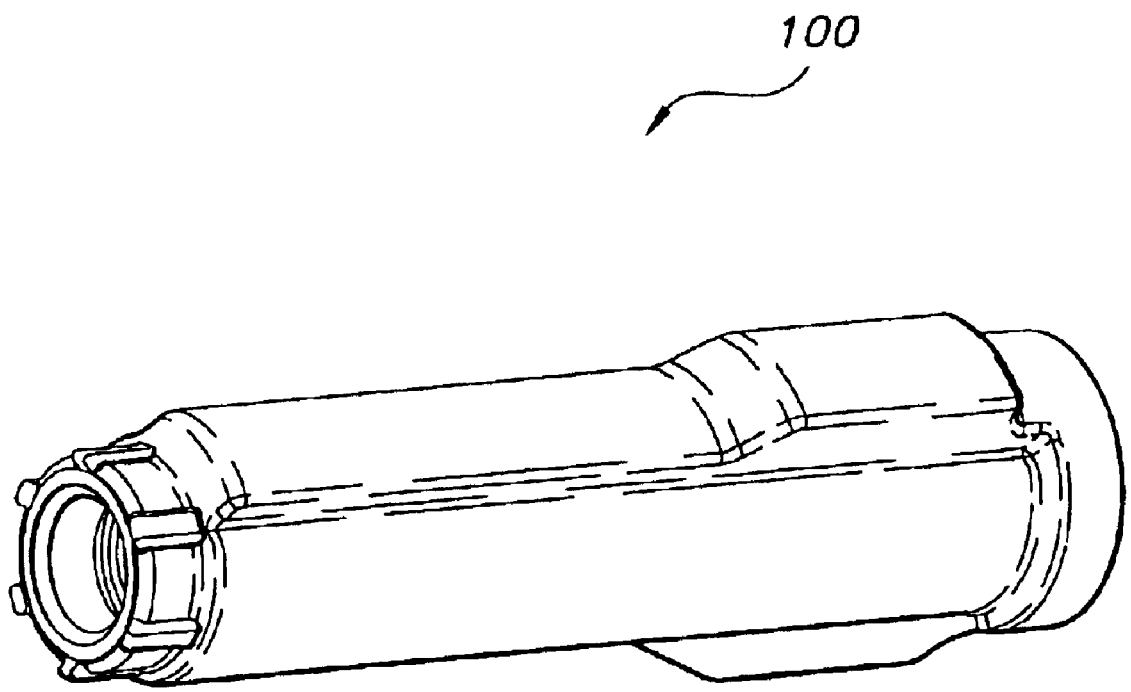
FIG. 7 is a perspective view of a further embodiment of an expansion joint of the present invention.

Even where one or other of conduits may include a long run which makes rotation of the conduit difficult, the fitting 30 itself may be threaded onto the conduit without disassembling the fitting. Similarly, where both conduits are unable to be rotated, the inner cylindrical body 14 can be rotated separately from the outer cylindrical body 16 so as to effect rotation of the fitting onto the conduits. As may be appreciated, as shown in FIG. 6, once the conduits 50 and 60 are attached to the fitting 10, movement of the conduits longitudinally with respect to one another, as may be caused by temperature variation, may be achieved by the telescopic movement of the inner cylindrical body 14 with respect to the outer cylindrical body 16.

Another embodiment of the present invention is shown in FIGS. 7–19, which provides an expansion joint having internal threads on the first end for receiving an externally threaded conduit therein. On the second end of the body is an externally threaded end cover that mates to the internal threads of the body. The second conduit is inserted through the cover during installation of the expansion joint.

Contained within the body is an internally threaded bushing for mating to the external threads of the second conduit. The bushing has two protrusions, spaced 180° apart, which are received within corresponding tracks or channels formed on the internal surface of the body. This prevents the bushing from rotating within the conduit body when one of the conduits is threadingly engaged therewith. Threaded within the body adjacent the end cover, and disposed partially within the channel, is an end stop that includes an extension serving as a mechanical stop to prevent the bushing from retracting too far within the body. Top and bottom terminals are formed on the end stop that are also received within the channels. A first end of a grounding braid screws into each of these terminals and the braid extends through the channels to corresponding terminals on the bushing where the second end is screwed into such terminals. This grounds the two pieces of conduit together. Additionally, a clearance chamber is formed above each channel for receiving excess slack of the braid when the bushing nears the end stop.

As illustrated in FIGS. 7–19 sections of rigid conduit 106, 107, each of which may be subject to longitudinal movement, without the need for an external bonding jumper or clamps to ground the two sections of conduit 106, 107 together.

Figure 8:
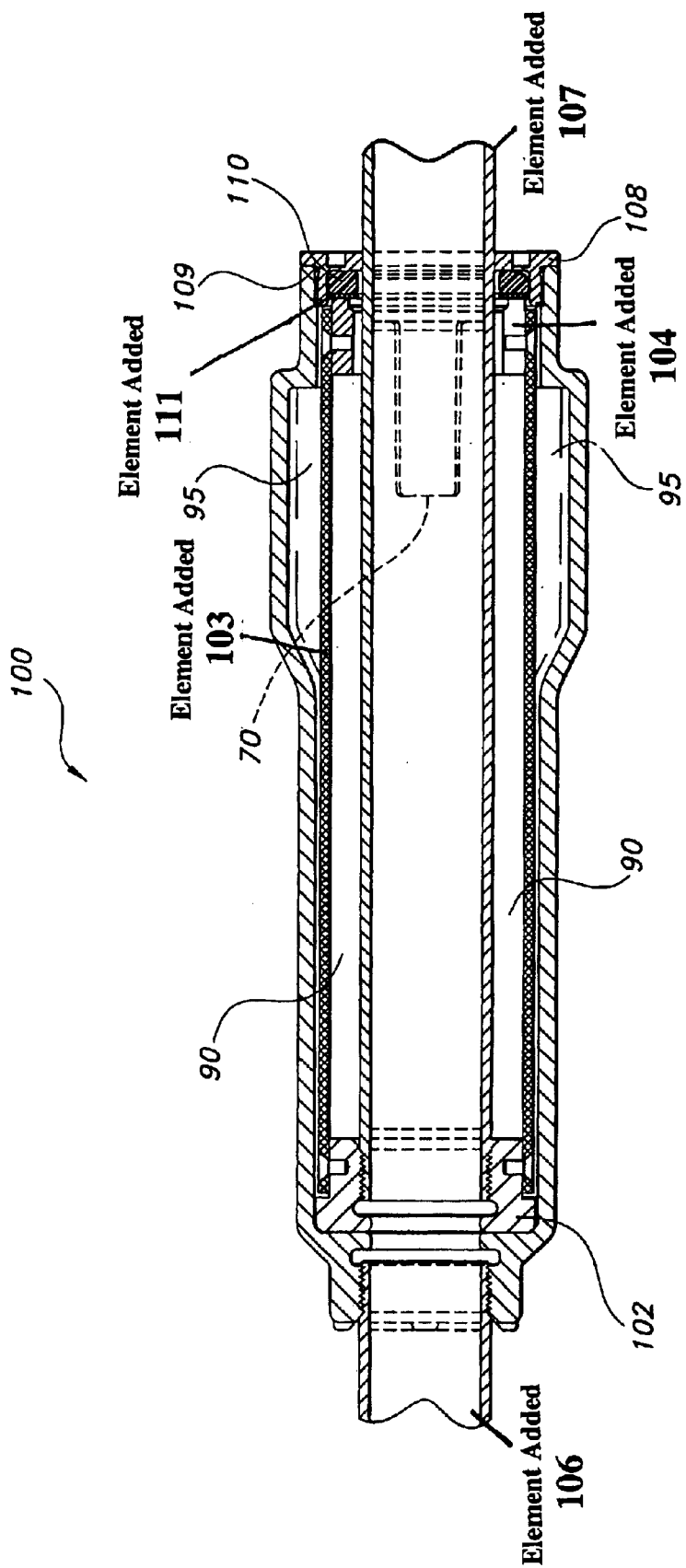
FIG. 8 is a cross-sectional view of the expansion joint of FIG. 7.

The first end of the expansion joint 100 or body includes internal threads for receiving an externally threaded conduit 106 therein, as shown in FIG. 8. On the second end of the expansion joint 100 is an externally threaded end cover 108 that mates to the internal threads of the expansion joint 100. The second conduit 107 is inserted through the end cover 108 during installation of the expansion joint 100. The end cover 108 is best shown in FIGS. 8, 10–12, and it includes a sealing o-ring 109, a gasket ring 110, and a flat washer 111.

Figure 9:
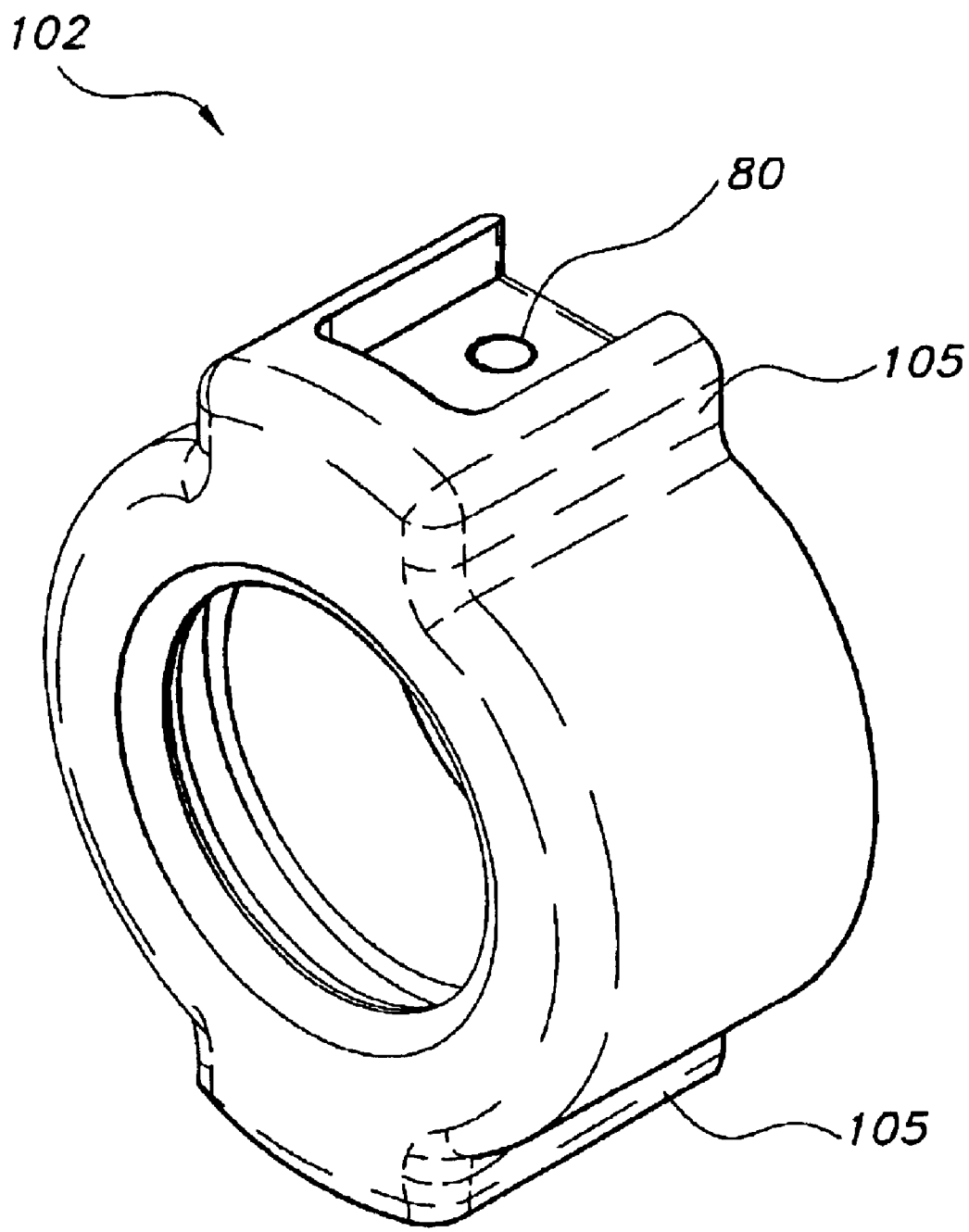
FIG. 9 is a perspective view of a bushing of the expansion joint of FIG. 7.
Figure 11:
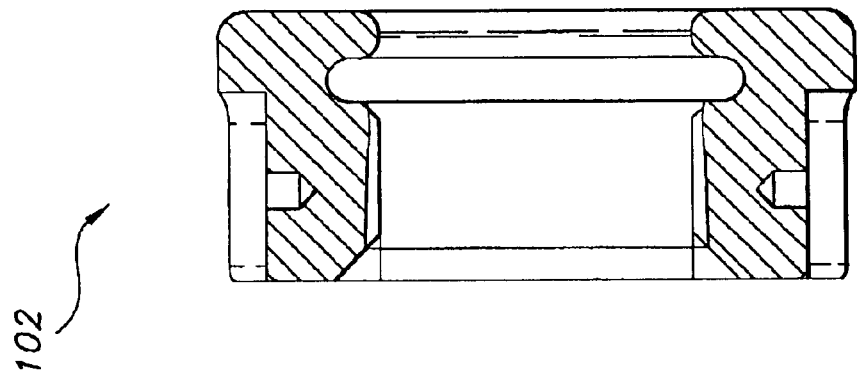
FIG. 11 is a cross-sectional view of the bushing of the expansion joint of FIG. 7 taken along sight line A—A of FIG. 10.
Figure 10:
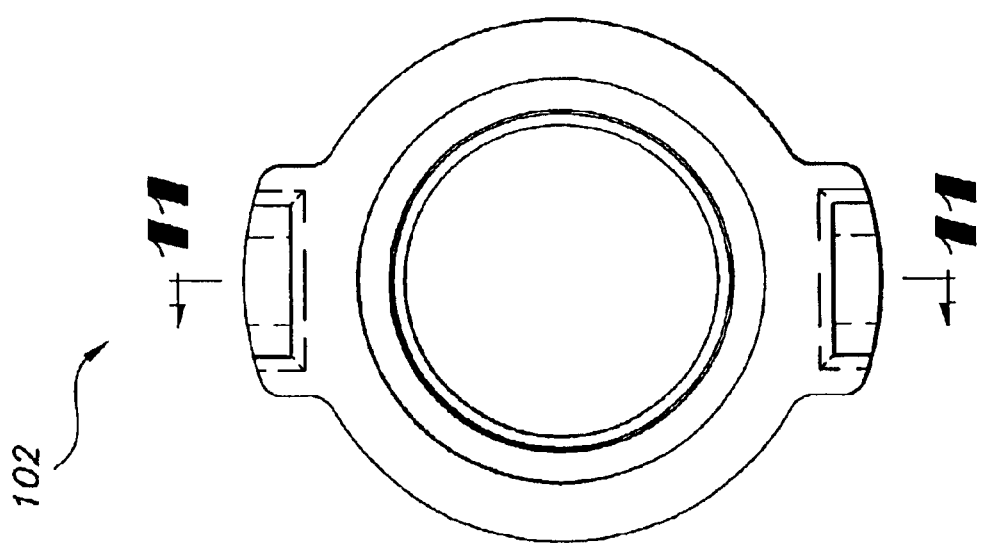
FIG. 10 is a front elevational view of the bushing of the expansion joint of FIG. 7
Figure 12:
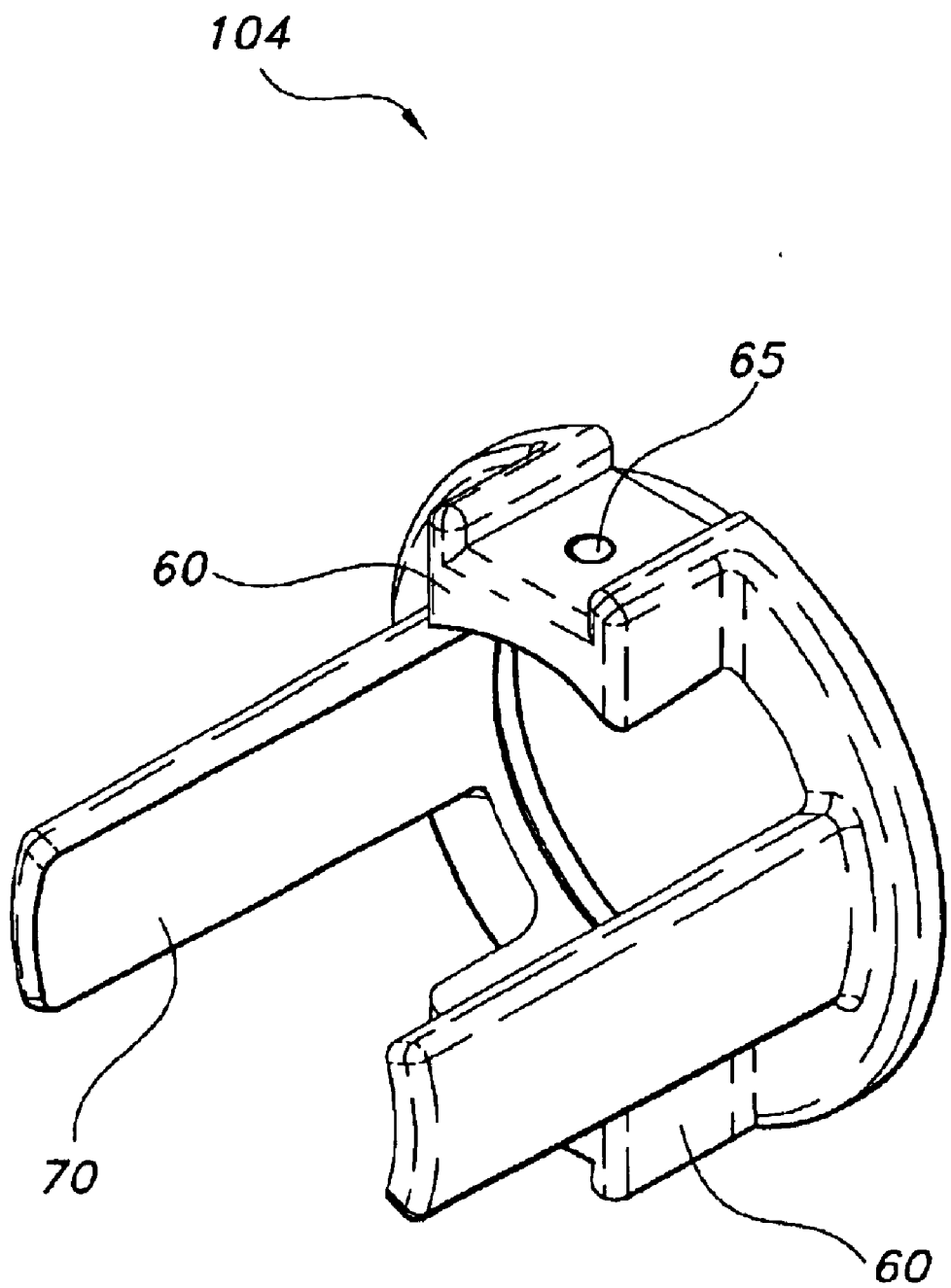
FIG. 12 is a perspective view of a mechanical stop that is contained within the expansion joint of FIG. 7.
Figure 13:
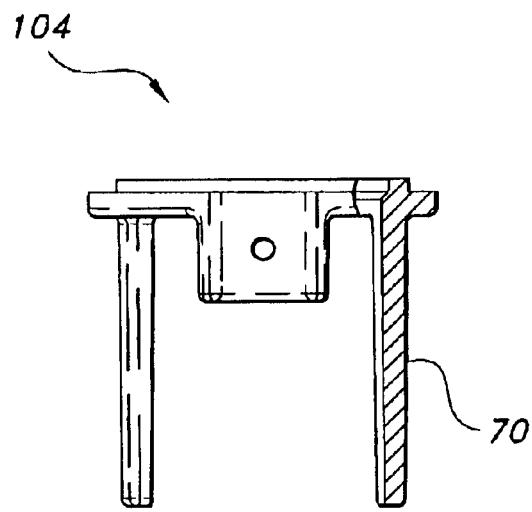
FIG. 13 is a plan view of the mechanical stop of the expansion joint of FIG. 7.
Figure 14:
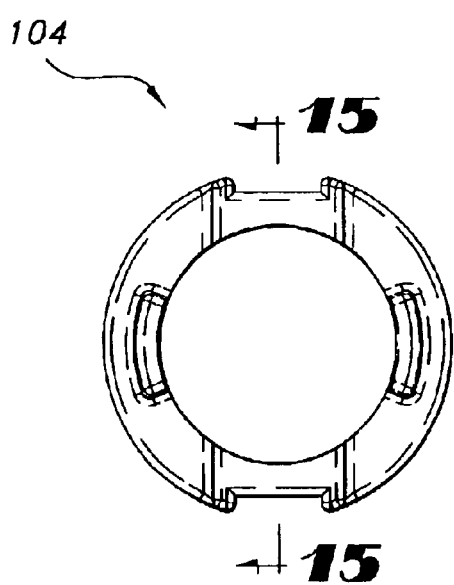
FIG. 14 is a front elevational view of the mechanical stop of the expansion joint of FIG. 7.
Figure 15:
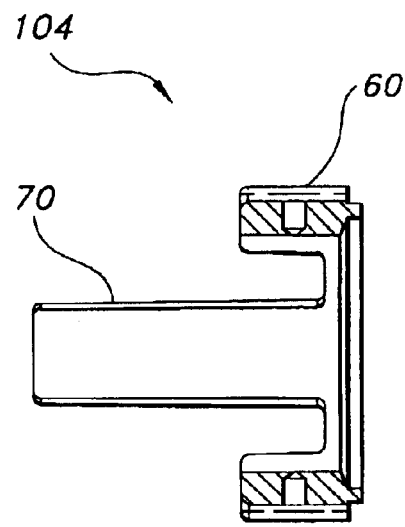
FIG. 15 is a cross-sectional view of the mechanical stop of the expansion joint of FIG. 7 taken along sight line A—A of FIG. 14.
Figure 16:
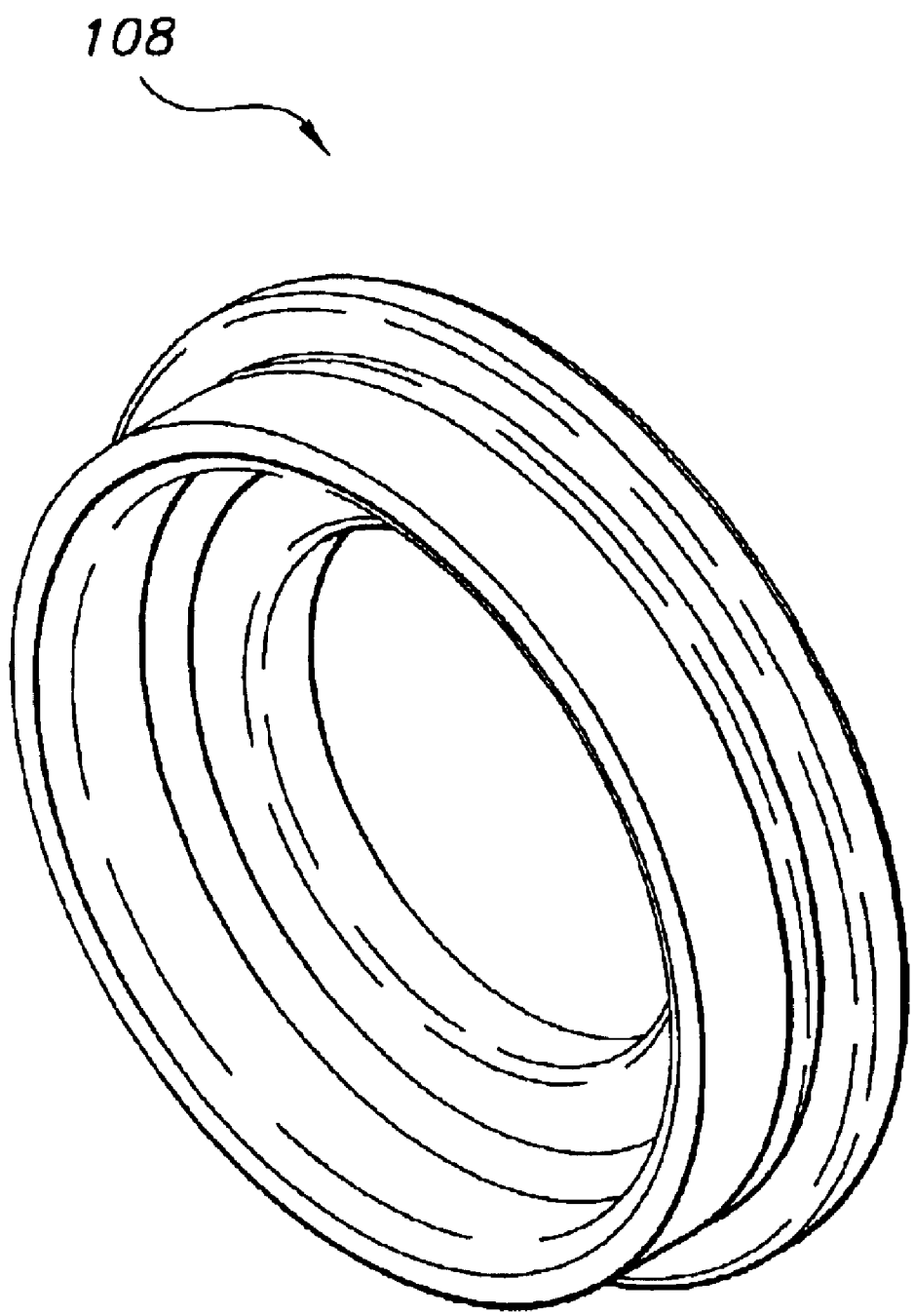
FIG. 16 is a perspective view of an end cover of the expansion joint of FIG. 7.

Contained within the expansion joint 100 is an internally threaded bushing 102 for mating to the external threads of the second conduit 107. As is best seen in FIG. 9, the bushing 102 has two protrusions 105, spaced 180° apart, which are received within corresponding tracks or channels 90 formed on the internal surface of the expansion joint 100. This prevents the bushing 102 from rotating within the expansion joint 100 when one of the conduits 106, 107 is threadingly engaged therewith. It is appreciated that the present invention could operate with only one protrusions 105 in one of the channels 90 although it is not preferred. First apertures 80, which are preferably threaded, are contained within the protrusions 105 for receiving a screw therein for clamping one end of a flexible conductive braided cable 103 thereto. The bushing 102 is further shown in FIGS. 10 and 11.

Figure 18:
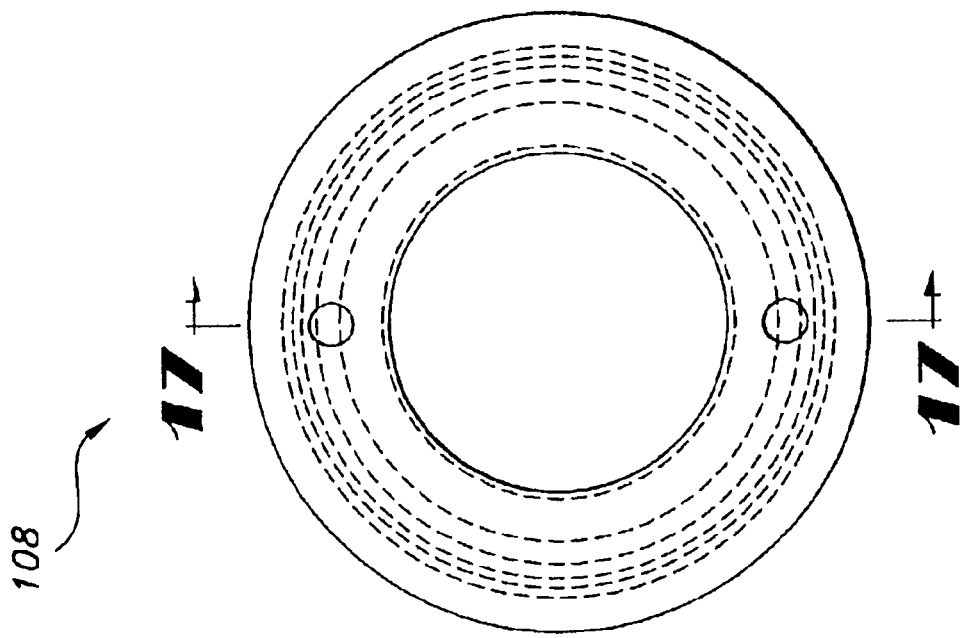
FIG. 18 is a cross-sectional view of the end cover of the expansion joint of FIG. 7.
Figure 17:
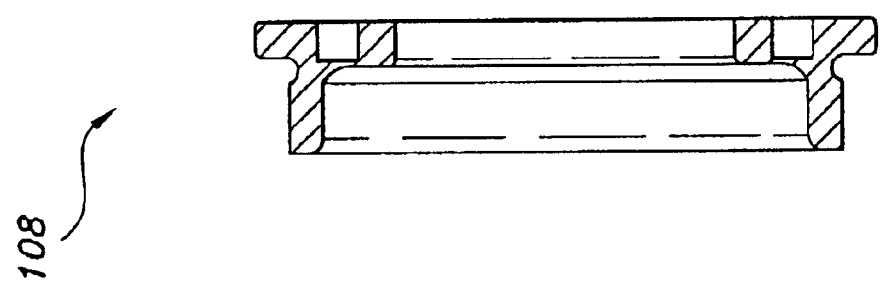
FIG. 17 is a front elevational view of an end cover of the expansion joint of FIG. 7.

Threaded within the expansion joint 100 adjacent the end cover 108, and disposed partially within the at least one of the channels 90, is an end stop 104 that includes an extension 70 that serves as a mechanical stop to prevent the bushing 102 from retracting too far within the expansion joint 100. Top and bottom terminals 60 are formed on the end stop 104 that are also received within the channels 90. A second end of the flexible braided cable 103 screws into a second aperture 65 of each of these terminals and the braided cable 103 extends through the channels 90 to corresponding protrusions 105 on the bushing 102. This grounds the end stop 104 to the bushing 102, thereby grounding the two conduits 106,107 together. As housing 102 moves towards end stop 104, slack or excess collapsed cable is formed. A clearance chamber 95 is integrally formed with each channel 90 for receiving excess slack of the braided cable 103 when the bushing 102 nears the end stop 104. The braided cable 103 is shown in FIGS. 18 and 19.

The installation requires only that conduit 106 be threaded in one end of the expansion joint 100 and the other conduit 107 be inserted into the expansion joint 100 and be threaded into the internal bushing 102. As stated above internal grounding is provided by two flexible cables 103 screwed into the stationary mounting end stop 104 with the other end bolted to the movable threaded bushing 102. The bushing 102 has top and bottom protrusions 105 to act as a linear guide and prevent it from rotating during conduit 107 screw-in and tightening. When the conduit pipe 107 is threaded into this bushing 102, grounding continuity goes through the bolted flexible cable 103, then to the stationary mounting end stop 104 that is attached to the joint extension 100, and then to the other conduit 106. Internal parts are held securely in place by the end cover 108. Sealing for wet locations are done by an o-ring 109, a gasket ring 100, and a flat washer 111.

Alternate embodiments include a sub-assembly of a stationary end stop 104 wherein an annular wire mesh grounding element that can contract and expand is welded-soldered cylindrically around on both ends with the movable bushing 102 on the other end. The annual grounding element need not be fully cylindrical and can be a section or several sections of a cylindrical shaped annular wire mesh.

It is apparent that equivalent alterations and modifications will occur to others skilled in the art upon the reading and understanding of this specification. As such, the present invention, which includes all such equivalent alterations and modifications, is intended to be illustrative rather than limiting.

What is claimed is:

1. An electrical expansion joint for interconnecting a pair of electrical conduits comprising:
    an elongate generally cylindrical outer body having an attachment end for attachment to one of said conduits of said pair and a reception end for receiving the other of said conduit of said pair; and
    a conduit mounting bushing being attachable to said other conduit and being non-rotatably movably supported along at least an extent of said outer body, said conduit mounting bushing and said outer body include cooperative structure to prevent relative rotation therebetween, wherein said cooperative structure includes said outer body having an elongate internal chamber extending from the attachment end to the reception end and said conduit mounting bushing includes a protrusion for accommodation within said chamber; and
    a grounding component for maintaining ground continuity between the conduit mounting bushing and said outer body throughout movement of said conduit mounting bushing within said outer body.

2. An expansion joint of claim 1 wherein said conduit bushing is non-rotatably movably supported within said outer body.

3. An expansion joint of claim 1 wherein said conduit bushing is non-rotatably movably supported along a substantial portion of said outer body.

4. An expansion joint of claim 1, wherein said conduit mounting bushing includes a threaded portion for threaded attachment of said other conduit of said pair thereto.

5. An expansion joint of claim 1, wherein said grounding component includes a conductive braid, said braid is an elongate member extending through said internal chamber of the body.

6. An expansion joint of claim 5, wherein said conductive braid includes a first end attachable to said conduit mounting bushing and a second end attachable to a stationary end stop positioned partially within the chamber at the attachment end of the outer body, said conductive braid being collapsible upon movement of said conduit mounting bushing with respect to said outer body.

7. An expansion joint of claim 6, wherein said internal chamber of said outer body provides for accommodation of said collapsible braid.

8. An expansion joint of claim 1, wherein said other conduit is attachable to said conduit mounting bushing interiorly of said outer body.

9. An expansion joint of claim 1 wherein said outer body includes a pair of said internal chambers located diametrically opposite to each other, and said bushing includes a pair of said protrusions located diametrically opposite to each other.

10. An expansion joint for interconnecting a pair of conduits comprising:

an elongate cylindrical outer body having a first end for attachment to one conduit of said pair;

a bushing movably supported within said outer body for attaching to said other conduit of said pair within said outer body;

a grounding component maintaining ground continuity between said bushing and said outer body upon movement of said bushing within said outer body; and means for interiorly preventing rotation of said bushing while supported by said expansion joint upon attachment of said other conduit thereto wherein said rotation preventing means includes said outer body having an inwardly directed chamber and said bushing having an outwardly directed protrusion fittingly positioned in said inwardly directed channel.

11. An expansion joint of claim 10, wherein said ground component includes an elongate flexible braid extending between said bushing and said outer body.

12. An expansion joint of claim 11, wherein said flexible braid is collapsible.

13. An expansion joint of claim 12, wherein said chamber further accommodates said collapsible braid.

* * * * *